Nov. 7, 1944. A. GNESSIN 2,362,265

ROTARY CENTER ARRANGEMENT FOR TURNING MACHINES

Filed Oct. 7, 1943

INVENTOR.
Abraham Gnessin
BY
Zoltan Polachek
ATTORNEY

Patented Nov. 7, 1944

2,362,265

UNITED STATES PATENT OFFICE 2,362,265

ROTARY CENTER ARRANGEMENT FOR TURNING MACHINES

Abraham Gnessin, Elizabeth, N. J.

Application October 7, 1943, Serial No. 505,272

9 Claims. (Cl. 82—33)

This invention relates to new and useful improvements in a dead or stationary center holding means for lathes and other turning machines.

Heretofore, in the construction of lathes and other turning machines it has been common practice to equip the tail stock spindle of the machine with a device for holding the center stationarily in position in the tail stock spindle in a manner to engage the end of the work to be operated upon by the machine. Since the work generally is turned by the machine, holding the center in position causes the work to turn relative to the center, causing a certain amount of friction between these parts which is generally relieved by the application of a lubricant at the point where the center engages the center hole in the end of the work. However, the use of this lubricant in the prior art constructions has not completely eliminated the friction at this point, requiring that the center be periodically reground because of the wearing away of the center caused by the friction. It is generally known that to use a center construction of this type requires considerable skill in positioning the work in the machine to create as little friction as possible and at the same time hold the work in a steady position to be accurately operated upon.

It is the purpose of this invention to provide a novel means for rotatively supporting a center in the tail stock of a machine in a manner so that the center will turn with the work, eliminating all friction and the skill which is generally required in mounting the work in the machine to create as little friction as possible.

This arrangement, of inserting a fitted roller bearing between the center and the spindle, may be used in a variety of ways, using the present standard size centers and spindles or centers and spindles of varied shapes, the main feature of this invention being the idea of an arrangement whereby the center is free to turn while being held in place but separated from the spindle by an anti friction bearing or bearings of any design.

A further object of this invention proposes the construction of a center supporting means which may be used in connection with center to center machines, lathes, chuck to center machines, external grinding machines, and all machines of a similar nature employing a turning point in a stationary position engaging a rotating object upon which work is to be done.

A still further object of the invention proposes constructing the center holding means in such a manner that the center piece is free of all encumberances, including bearings and the like, and in which the bearings are a separate fitted part inserted between the bearing or standard center and tail stock spindle so that the center may be removed and replaced when necessary without involving the additional expenditure of replacing the bearings each time the center is changed.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figure 1:
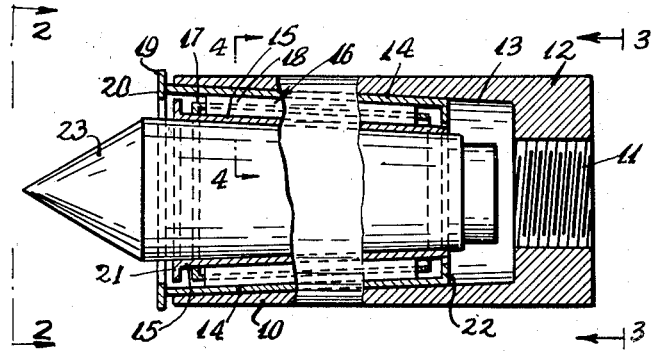
Fig. 1 is a longitudinal sectional view of a center and bearing constructed in accordance with this invention with a portion of this view being shown in elevation.
Figure 2:
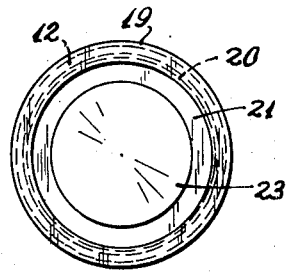
Fig. 2 is an end elevational view looking in the direction of the line 2—2 of Fig. 1.
Figure 3:
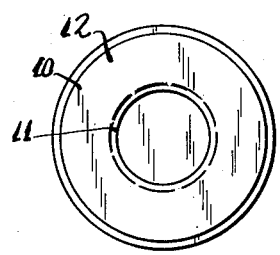
Fig. 3 is an end elevational view looking in the direction of the line 3—3 of Fig. 1.
Figure 4:
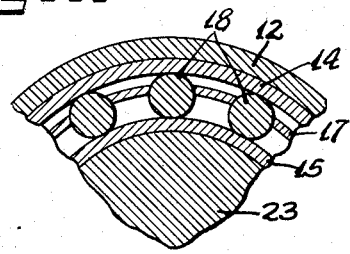
Fig. 4 is a fragmentary enlarged sectional view taken on the line 4—4 of Fig. 1.

The dead or stationary center holding means for lathes and other turning machines, according to this invention, includes a cup-like frusto-conical tubular housing 14 engaged into a frusto-conical tapered opening 13 in the end of a spindle 12 of the tailstock of a lathe or other turning machine tool. This spindle may be an integral part of the tailstock or be attached thereto by the threaded socket 11 or any other conventional manner.

A frusto-conical tubular center holding casing 15 is disposed within the tubular housing 14 and a cage and rollers 16' are disposed between the adjacent faces of the housing 14 and the casing 15. While one particular design of bearing is disclosed it should be borne in mind that other designs are equally applicable to the construction. The particular bearing 16 illustrated on the drawing includes a cage 17 supporting a plurality of frusto-conical roller bearings 18. A flange 19 is disposed on the outer end of the housing 14 and is normally spaced slightly from the end of the spindle 10 of the lathe or other turning machine. This flange 19 has an inwardly directed section 20 spaced from and overlapping a flange 21 formed on the outer end of the casing 15. The inner end of the housing 14 is formed with an inwardly directed flange 22.

The flange 19 could be used to pry out the center and/or the anti-friction bearing from the spindle.

The inwardly directed section 20 of the flange 19 and the inwardly directed flange 22 to retain the casing 15 in position within the housing 14, preventing it from dropping out of the ends thereof.

A center 23 is shown mounted in position within the casing 15 with its pointed end projected beyond the flange 19 and the outer end of the spindle 10.

An important feature of the invention resides in the fact that the center 23 is rotatively supported with relation to the spindle 10 so that when it is engaged with a piece of work it will turn with the work, eliminating friction between the contacting surfaces of the work and center, causing the work to be held steadily in position while at the same time permitting the same freedom of rotation as is generally known in the art. Since the center 23 is not an integral unit with its bearing supporting members it may be removed and replaced inexpensively since the bearings may be used for supporting a number of centers, involving merely the expense of replacing the center.

Figure 5:
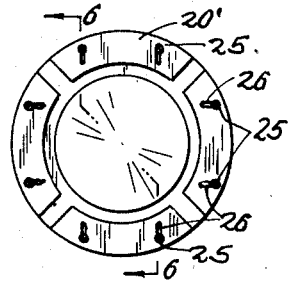
Fig. 5 is an end elevational view of a center holding means constructed in accordance with another form of the invention.
Figure 6:
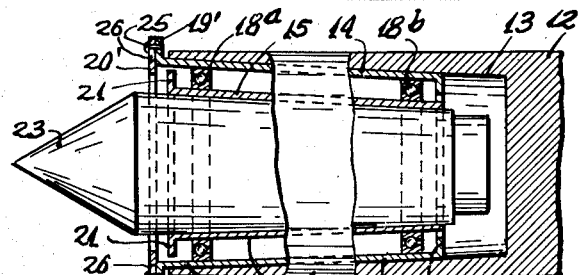
Fig. 6 is a sectional view taken on the line 6—6 of Fig. 5 with a portion thereof being illustrated in elevation.

In Figs. 5 and 6 a modified form of the invention is illustrated in which a pair of spaced ball bearings 18ª and 18ᵇ are interposed between the housing 14 and the casing 15. These ball bearings comprise concentric races having spherical balls disposed therebetween in a manner to permit the casing 15 to rotate freely relative to the housing 14.

The housing 14 in this form of the invention is formed with a flange 19' which extends outwards relative to the center 23. This outwardly extending flange 19' is provided with an auxiliary flange 20'. The auxiliary flange 20' is formed of a plurality of separately arcuately shaped members which are adjustably held in various positions relative to the flange 19' by screws 25. These screws 25 pass freely through elongated slots 26 formed in the arcuate members of the flange 20' and threadedly engage complementary openings formed in the flange 19'.

Figure 7:
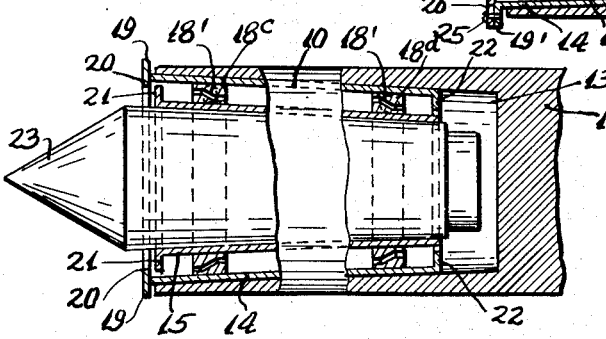
Fig. 7 is a view similar to Fig. 1 but illustrating another form of the invention.

In Fig. 7 another modified form of the invention is disclosed which is similar to the first form, distinguishing in that the adjacent faces of the housing 14 and casing 15 are provided with a pair of spaced spherical metal balls 18ᶜ and 18ᵈ. These spherical balls are disposed between inner and outer races between which elongated rollers 18 are mounted. In other respects this form of the invention is similar to that previously shown and like reference numerals identify like parts in each of the several views.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In combination with a spindle of a lathe or other machine tool, a center-holding means, comprising a cup-like frusto-conical tubular housing engaging in a frusto-conical tapered opening in the end of said spindle, a frusto-conical tubular center holding casing disposed within said housing, a cage and rollers between said housing and casing, and a center mounted in said casing and projecting from the end of said spindle.

2. In combination with a spindle of a lathe or other machine tool, a center-holding means, comprising a cup-like frusto-conical tubular housing engaging in a frusto conical tapered opening in the end of said spindle, a frusto-conical tubular center holding casing disposed within said housing, a cage and rollers between said housing and casing, and a center mounted in said casing and projecting from the end of said spindle, and a flange on the outer end of said housing slightly spaced from said body.

3. In combination with a spindle of a lathe or other machine tool, a center-holding means, comprising a cup-like frusto-conical tubular housing engaging in a frusto-conical tapered opening in the end of said spindle, a frusto-conical tubular center holding casing disposed within said housing, a cage and rollers between said housing and casing, and a center mounted in said casing and projecting from the end of said spindle, and a flange on the outer end of said housing slightly spaced from said body, said flange having an outwardly directed section and an inwardly directed section relative to said housing.

4. In combination with a spindle of a lathe or other machine tool, a center-holding means, comprising a cup-like frusto-conical tubular housing engaging in a frusto-conical tapered opening in the end of said spindle, a frusto-conical tubular center holding casing disposed within said housing, a cage and rollers between said housing and casing, and a center mounted in said casing and projecting from the end of said spindle, and a flange on the outer end of said housing slightly spaced from said body, said flange having an outwardly directed section and an inwardly directed section relative to said housing, and an inwardly directed flange formed on the inner end of said housing.

5. In combination with a spindle of a lathe or other machine tool, a center-holding means, comprising a cup-like frusto-conical tubular housing engaging in a frusto-conical tapered opening in the end of said spindle, a frusto-conical tubular center holding casing disposed within said housing, a cage and rollers between said housing and casing, and a center mounted in said casing and projecting from the end of said spindle, said bearings comprising a roller cage and a plurality of rollers.

6. In combination with a spindle of a lathe or other machine tool, a center-holding means, comprising a cup-like frusto-conical tubular housing engaging in a frusto-conical tapered opening in the end of said spindle, a frusto-conical tubular center holding casing disposed within said housing, a cage and rollers between said housing and casing, and a center mounted in said casing and projecting from the end of said spindle, said bearings comprising spaced bearing sections consisting of inner and outer races and balls in between.

7. In combination with a spindle of a lathe or other machine tool, a center-holding means, comprising a cup-like frusto-conical tubular housing engaging in a frusto-conical tapered opening in the end of said spindle, a frusto-conical tubular center holding casing disposed within said housing, a cage and rollers between said housing and casing, and a center mounted in said casing and projecting from the end of said spindle, said bearings comprising spaced bearing sections consisting of inner and outer races and roller bearings disposed between these races.

8. In combination with a spindle of a lathe or other machine tool, a center-holding means, comprising a cup-like frusto-conical tubular housing engaging in a frusto-conical tapered opening in the end of said spindle, a frusto-conical tubular center holding casing disposed within said housing, a cage and rollers between said housing and casing, and a center mounted in said casing and projecting from the end of said spindle, and a flange on the outer end of said housing slightly spaced from said body, and a plurality of arcuate flange sections vertically adjustably mounted on said flange.

9. In combination with a spindle of a lathe or other machine tool, a center-holding means, comprising a cup-like frusto-conical tubular housing engaging in a frusto conical tapered opening in the end of said spindle, a frusto-conical tubular center holding casing disposed within said housing, a cage and rollers between said housing and casing, and a center mounted in said casing and projecting from the end of said spindle, and a flange on the outer end of said housing slightly spaced from said body, and a plurality of arcuate flange sections vertically adjustably mounted on said flange, said arcuate flange sections being held in position by means of screws passing through slots in said flange sections and threadedly engaging openings in said flange.

ABRAHAM GNESSIN.